United States Patent [19]

Burn

[11] 4,101,952

[45] Jul. 18, 1978

[54] MONOLITHIC BASE-METAL GLASS-CERAMIC CAPACITOR

[75] Inventor: Ian Burn, Williamstown, Mass.

[73] Assignee: Sprague Electric Company, North Adams, Mass.

[21] Appl. No.: 715,036

[22] Filed: Aug. 17, 1976

[51] Int. Cl.² .................. H01G 1/01; H01G 4/08
[52] U.S. Cl. .................... 361/305; 361/320; 252/513; 252/514; 106/1.18
[58] Field of Search ............ 317/258, 261; 106/1; 252/513, 514; 361/305, 320

[56] References Cited

U.S. PATENT DOCUMENTS

| 3,763,409 | 10/1973 | Sheard | 317/258 |
| 3,902,102 | 8/1975 | Burn | 317/258 |

Primary Examiner—Benjamin R. Padgett
Assistant Examiner—Josaphina L. Barr
Attorney, Agent, or Firm—Connolly and Hutz

[57] ABSTRACT

A monolithic ceramic capacitor has base-metal electrodes buried in a high dielectric constant reduction resistant glass-ceramic body. The glass component is an alkaline earth aluminoborate glass. The ceramic component is a barium titanate. The capacitor body is sintered at from 950° C to 1080° C in a low partial oxygen atmosphere. The buried electrode may be elementary copper.

21 Claims, 7 Drawing Figures

MONOLITHIC BASE-METAL GLASS-CERAMIC CAPACITOR

BACKGROUND OF THE INVENTION

This invention relates to monolithic ceramic capacitors having base-metal electrodes and more particularly to such capacitors wherein the dielectric body is a reduction resistant glass-ceramic material having a low sintering temperature and a high dielectric constant.

Conventional monolithic ceramic capacitors are fired in air at a temperature of 1350° C or above. These capacitors employ electrodes of noble metals such as platinum or palladium, sometimes alloyed with gold. During the past few years a growing number of monolithic capacitors have been produced that have a glass-ceramic dielectric body, that are capable of being fired in air and fully densified at temperatures generally below 1200° C and that contain lower cost electrodes, usually of a palladiumsilver alloy. In addition, monolithic capacitors with even lower cost electrodes have been developed. These capacitors employ electrodes of a base metal such as Ni (sometimes referred to as b.m.e. monolithic capacitors).

Monolithic ceramic capacitors with base-metal electrodes, however, must be fired in an atmosphere of low oxygen pressure to prevent oxidation of the base metal which may render the base-metal non-conductive. Thus, the ceramic material must be reduction resistant to avoid becoming semiconductive or conductive during sintering in the low oxygen pressure atmosphere. Compared with monolithic ceramic capacitors having electrodes with noble metals, it is necessary in the manufacture of b.m.e. monolithic capacitors to provide more precise control over the stoichiometry of the ceramic formulation and to exercise tighter control over the firing conditions, both of which add cost in manufacturing.

Also, the glass-free ceramic materials normally used in such b.m.e. capacitors are particularly difficult if not impossible to sinter and fully densify at temperatures low enough to permit the use of copper electrodes. Copper melts at 1083° C and copper electroded monolithic capacitors must be fired below this temperature. It is accordingly not known to manufacture such copper electroded monolithic capacitors even though the conductivity of copper is over 4 times greater than that of nickel, the usual electrode material.

Further, regarding ceramic dielectric materials containing glass, no known high dielectric constant glass-ceramic materials are believed to be capable of sintering in a low partial oxygen atmosphere without experiencing greatly degraded electrical properties. The term dielectric constant (K) as used herein refers to the room temperature value unless otherwise noted and the term high dielectric constant refers to values greater than 1000. All glass compositions known to have been used in a high dielectric constant glass-reacted-ceramic have included the oxides of lead, cadmium and/or bismuth, each of which are readily reduced when heated in a low partial oxygen atmosphere. The major adverse effect of reducing these oxides is to render the glass-ceramic dielectric material conductive.

Accordingly, it is an object of the present invention to provide a b.m.e. monolithic ceramic capacitor having a reduction resistant body of high dielectric constant capable of sintering and fully densifying at temperatures below 1080° C.

It is a further object of the present invention to provide a monolithic ceramic capacitor having a buried copper electrode.

It is a further object of the present invention to provide a low cost monolithic capacitor having excellent electrical properties.

SUMMARY OF THE INVENTION

The monolithic ceramic capacitor of this invention comprises a reduction resistant glass-ceramic body and at least one buried base-metal electrode. Generally, at least another metal electrode is in contact with the body and is in capacitive relationship with the buried electrode. This invention recognizes the principle that an alkaline earth aluminoborate glass and a high firing barium titanate ceramic may be combined to form a very low firing reduction resistant glass-ceramic body that has a high dielectric constant.

The reduction resistant glass-ceramic body of this invention is capable of sintering and completely densifying in the low temperature range from 950° C to 1080° C in a low partial oxygen atmosphere. A major advantage realized is that the probability of chemical reduction of the glass-ceramic and the probability of oxidation of a base metal electrode buried therein are greatly diminished at these very low sintering temperatures, even if there is an occasional loss of control of the partial oxygen atmosphere or temperature during firing, because the rates at which these unwanted reactions tend to occur are now much lower than at the considerably higher temperatures that are optimum for firing conventional glass-free b.m.e. capacitors (e.g. 1350° C). For this reason and in contrast with conventional glass-free b.m.e. capacitors, the capacitors of this invention are comparatively tolerant of variations in the firing conditions and of deviations from stoichiometry of the ceramic formulations. Another major advantage is that the low firing temperatures permit the use of low cost controlled atmosphere tunnel-belt kilns which also have considerably lower energy consumption than those used for firing at higher temperatures. Yet another highly significant advantage is the capability of incorporating buried copper electrodes for cofiring with the reduction resistant body. This leads to very low electrode costs, high electrode conductivity and makes possible the use of more oxydizing atmospheres at firing than is possible when the buried electrode is chosen from any of the other base metals such as nickel, iron and cobalt. This, in turn, leads to improved dielectric properties as will be further elaborated.

The reduction resistant glass component consists of an alkaline earth borate glass. No more than trace amounts of the easily reduced oxides of cadmium, lead and bismuth should be included. Partial replacement of boron oxide by silica retards densification at sintering, lowers the dielectric constant and should be avoided. Small quantities of zinc oxide are believed to be permissible and may even be beneficial up to about 3% by weight. Partial replacement in these glasses of the alkaline earth metal with alkali metals such as Li, Na and K may also have suitable properties. Alumina is not essential in these glasses but generally improves chemical durability and inhibits devitrification.

It is important to recognize the degrading effects of using an alkaline earth borate formulation that does not wholly solidify as a glass. Upon cooling, such formulations form a mixture of glass and crystalline material that tends to increase the minimum temperature at which the glass-ceramic body fully densifies and to reduce the dielectric constant of the glass-ceramic body. Thus the term glass, as used herein refers to the conventional definition of formulations of oxides which do not devitrify and which form a wholly amorphous material on cooling. The basic glass formulations employed in this invention are identified by the shaded areas in the phase diagrams of FIGS. 3, 4, 5 and 6. These glasses are found disclosed by C. Hirayama, Journal of the American Ceramic Society, 1961, Vol. 44, No. 12, on page 604. Note that although some certain few of the indicated glass formulations may contain no alumina, the generic term alkaline earth aluminoborate glass is intended to include them, since they represent special limiting examples of the class.

The glass content in the glass-ceramic body is restricted to no more than 15 weight percent, again to provide a body having a high dielectric constant. Lower amounts tend to provide even a larger dielectric constant but also tend to raise the minimum firing temperature at which the body fully densifies. At least 5% by weight of the glass is needed to provide a characteristic sintering and full densification temperature at least as low as 1080° C.

The ceramic component is a crystalline ceramic phase, preferably but not necessarily a single phase, having a characteristic sintering and densification temperature of greater than 1200° C. It is further characterized as a barium titanate wherein at least 50 mole percent of the barium may be replaced by others of the alkaline earth metals, strontium, calcium and magnesium. Also, up to about 20 mole percent of the titanate may be replaced by a zirconate. These formulation limitations of the ceramic phase of the glass-ceramic body are necessary to provide a dielectric constant of the glass-ceramic body greater than 1000.

DESCRIPTION OF THE PREFERRED EMBODIMENTS

EXAMPLE 1

A ceramic powder of formulation $Ba_{0.65}Sr_{0.35}TiO_3$ was prepared by blending in water 987.2 grams of $BaCO_3$ with 397.8 grams of $SrCO_3$ and 615.0 grams of $TiO_2$, which was then dried, granulated and calcined at 1230° C. No acceptor (or donor) dopants were added to the ceramic formulation as is typically necessary in b.m.e. capacitors of the prior art. For example see U.S. Pat. No. 3,920,781 issued Nov. 18, 1975 and assigned to the same assignee. After being jet pulverized, 100 grams of the powder was mixed with 7.3 grams of glass powder of composition $4BaO.Al_2O_3.2B_2O_3$ prepared as described in U.S. Pat. No. 3,902,102 issued Aug. 26, 1975 and assigned to the same assignee. The mixture was milled with 30 grams of organic binder for 12 hours in a 200 cc capacity porcelain mill. The slip was cast on a glass plate after milling, using the doctor-blade technique, and when dry was cut into small squares approximately 10×10×0.5 millimeters. Copper paste, made by mixing 17.0 grams of ethyl cellulose binder with 28.5 grams of copper powder being of 99.9% purity and from 1 to 5 microns particle size was then painted on both sides of the squares, and dried before firing.

The squares were fired for 2 hours at 1050° C in a $CO_2$-CO mixture that produced an oxygen partial pressure of approximately $5\times10^{-10}$ atmospheres of oxygen as indicated by a zirconia oxygen monitor extending into the hot-zone of the furnace. The objective in preparing these "wafer" capacitors was to simplify the evaluation of ceramic dielectrics for use in a monolithic capacitor, as explained in my pending application Ser. No. 582,060 filed May 29, 1975 that is assigned to the same assignee. The capacitors of this example had a dielectric constant (K) of approximately 3500 and an insulation resistance (IR) of 4000 ohm-farads ($\Omega F$) at 25° C and 350 ohm-farads at 125° C.

EXAMPLE 2

The capacitors of this example were similar to those in Example 1 except 15 weight percent glass was used instead of 6.8 weight percent, and the wafer capacitors were fired with full densification at 950° C for 2 hours with an oxygen partial pressure $10^{-11}$ atmospheres of oxygen. Although the higher glass content permitted a lower firing temperature than in Example 1, to achieve full densification, the dielectric constant of the capacitors of Example 2 was reduced to approximately 1050.

EXAMPLE 3

Figure 7:
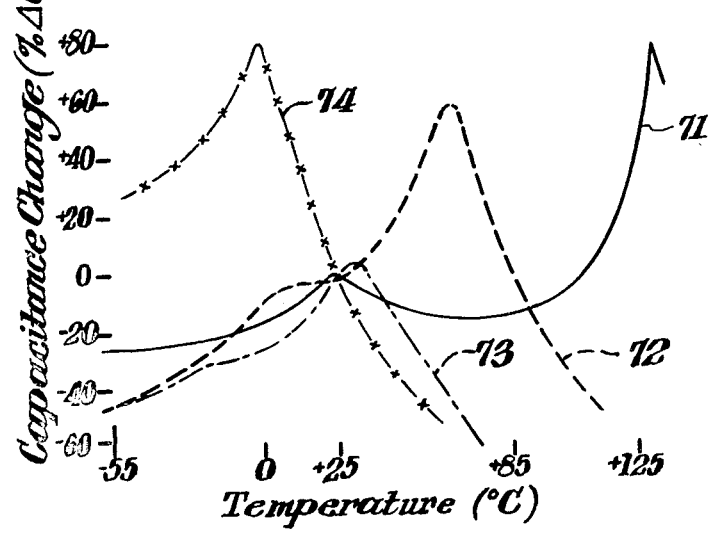
FIG. 7 shows a graph of the change in capacitance of four capacitors of this invention, wherein the ceramic of the glass-ceramic body is comprised of barium titanate with varying amounts of strontium being substituted for the barium.

Represents a series of experimental wafer capacitors that were prepared as in Example 1 but with ceramic powders of differing strontium levels. The strontium content ranged from 0 to 45 mole percent of the alkaline earth oxide and the dielectric properties were essentially similar to those of Example 1 except that the dielectric constant at 25° C depended on the position of the Curie point (Tc), which decreased with increasing strontium content. At the extremes of 0 and 45 mole percent $SrTiO_3$, the dielectric constant was approximately 2000. There are shown in FIG. 7 the temperature coefficient of capacity curves 71, 72, 73 and 74, corresponding to capacitors in this series having 0, 25%, 35% and 45% molar parts strontium in the ceramic formulations, respectively. A particularly useful ceramic composition range consists in 25 to 50 molar parts strontium and 75–50 molar parts barium titanate.

EXAMPLE 4

It was found that an addition of $CaTiO_3$ to the ceramic slip of Example 1 decreased the dielectric losses of the capacitors. A ceramic slip was made containing 88.5 grams of the barium strontium titanate ceramic of Example 1, 6.8 grams of the barium aluminoborate glass and 4.7 grams of calcium titanate. Wafer capacitors with copper electrodes were fired as in Example 1, and similar dielectric properties were obtained as before except that the dissipation factor (DF) at 1 kHz and 1Vrms (approx. 2V/mm) was 1.7% compared with 3.8% with no calcium titanate.

EXAMPLE 4a

In this example the ceramic slip of Example 4 was made into monolithic capacitors each having a pair of internal copper electrodes separating a thin dielectric layer approximately 80 micrometers thick before firing. The monolithic capacitors were made by screen printing several layers of ceramic onto glass plates and then printing on each an electrode coating of copper paste (made with Cu-200 powder as supplied by Cobaloy Company, Arlington, Texas), followed by more ceramic, then a second electrode coating, and finally several more layers of ceramic.

Figure 1:
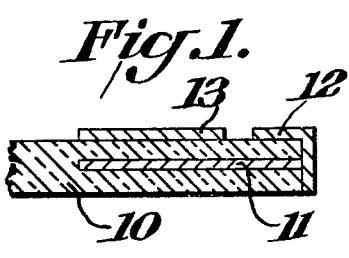
FIG. 1 shows in cross sectional view a monolithic capacitor of this invention having a reduction resistant glass-ceramic body 10, one base-metal electrode 11 buried therein, an external conductive terminal 12 by which external contact is made to the electrode 11, and another electrode 13 in contact with body 10 and in capacitive relationship with buried electrode 11.
Figure 2:
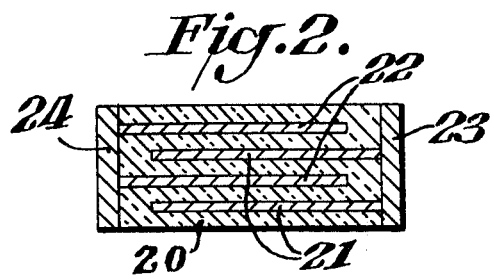
FIG. 2 shows in cross sectional view a monolithic capacitor of this invention having a reduction resistant glass-ceramic body 20, a group of base-metal electrodes 21 being interleaved with and in capacitive relationship with another group of base-metal electrodes 22, all said electrodes being buried within the body 20, and external terminals 23 and 24 being connected to the group 21 and group 22 of electrodes, respectively.
Figure 3:
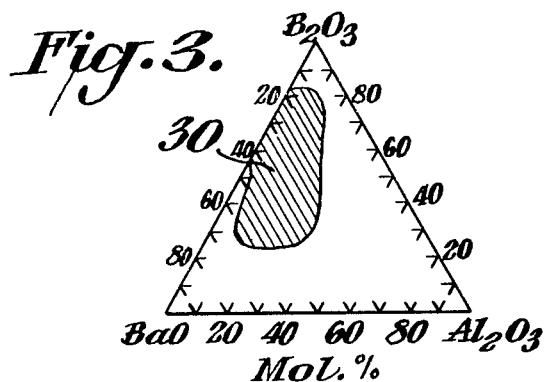
FIG. 3 shows the glass region 30 in a phase diagram of barium aluminoborate that may be employed in the glass-ceramic capacitor body of this invention.
Figure 4:
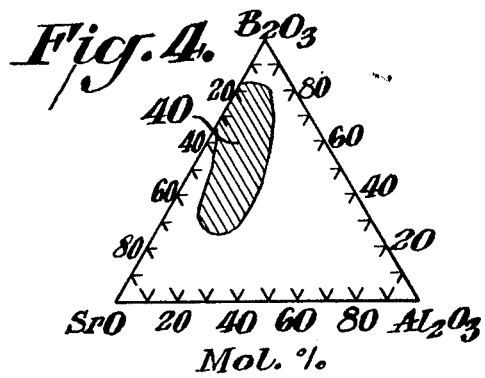
FIG. 4 shows the glass region 40 in a phase diagram of strontium aluminoborate that may be employed in the glass-ceramic capacitor body of this invention.
Figure 5:
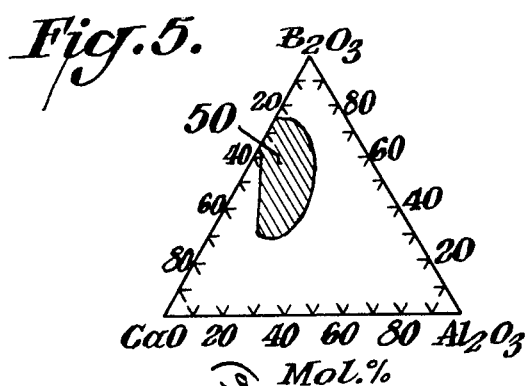
FIG. 5 shows the glass region 50 in a phase diagram of calcium aluminoborate that may be employed in the glass-ceramic capacitor body of this invention.
Figure 6:
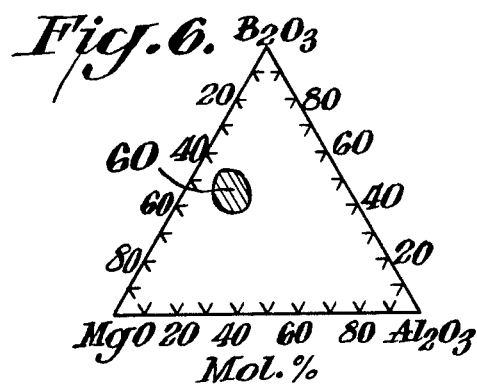
FIG. 6 shows the glass region 60 in a phase diagram of magnesium aluminoborate which may be partially substituted for the above noted glasses in the glass-ceramic capacitor body of this invention.

Finished green units were removed from the glass plates and terminations applied as indicated in FIG. 2 to end faces of the stack and in contact with the buried electrode paste coatings. The same copper paste was used. These monolithic capacitors were fired as in Example 1 and then the terminations were dipped in 60Sn – 40Pb solder at 230° C, using a non-activated rosin flux, and wire leads (not shown) were solder attached. Dielectric properties were very similar to those obtained on the wafer capacitors of Example 4, allowing for differences in signal field strength resulting from the thinner dielectric layers of the monolithic capacitors.

At 1 kHz with a signal field of 20Vrms/mm (0.5V/mil) the dielectric constant was measured as 2920, the Curie point was 30° C and DF was 3.0%. Insulation resistance averaged 3450 ohm-farads at 25° C, and 320 at 125° C. The dependence of capacitance on temperature (TCC) was within +22% and −56% from +10° C to 85° C, conforming to the Electronic Industries Standard, designated Z5U.

EXAMPLE 5

Instead of using strontium in the ceramic powder, zirconium may be used to adjust the Curie temperature of the barium titanate. Such a composition was prepared by calcining (at 1230° C) 1385.8 grams of $BaCO_3$, 462.8 grams of $TiO_2$ and 151.4 grams of $ZrO_2$ that had been homomixed and granulated. The formulation was intended to produce a composition $BaTi_{0.825}Zr_{0.175}O_3$. After being jet pulverized, 100.0 grams of the powder was milled with 7.33 grams of the same glass as before, and then hand screened monolithics with copper electrodes were made, as in Example 4a., but without terminations. These monolithics were fired at 1050° C for 2 hours in a $CO-CO_2$ atmosphere containing between $10^{-7}$ and $10^{-8}$ atmospheres of oxygen. With more reducing conditions there was a tendency for the electrodes to ball-up. Air-dry silver electrode terminations were used to evaluate the dielectric properties which were briefly as follows: Curie temperature (Tc), 60° C; dielectric constant at 25° C, 1325; DF, 3.8%.

EXAMPLES 6, 7, 8, 9 and 10

Other combinations which illustrate how additions of Sr, Ca and Zr may be used in combinations in the ceramic powder are shown as examples 6 through 10 in Table 1. In all the examples shown in Table 1 below, 6.8 weight percent of $4BaO.Al_2O_3.2B_2O_3$ glass was used and the green capacitors with copper electrodes were fired for 2 hours at 1050° C and at $5 \times 10^{-10}$ atmospheres of oxygen.

Table 1

| Ex. | Ceramic Formulation (mol %) | | | | | Tc (° C) | K | DF(%) 1kHz, 1V | IR at 25° C (ΩF) | at 125° C | Notes |
| --- | --- | --- | --- | --- | --- | --- | --- | --- | --- | --- | --- |
|  | BaO | SrO | CaO | $TiO_2$ | $ZrO_2$ |  |  |  |  |  |  |
| 4 | 30.0 | 16.1 | 3.9 | 50.0 |  | 32 | 3000 | 1.7 | 3300 | 300 |  |
| 6 | 34.8 | 15.2 |  | 48.2 | 1.8 | 48 | 2600 | 1.75 | 3500 | 350 |  |
| 7 | 32.5 | 17.5 |  | 47.7 | 2.3 | 31 | 3000 | 2.1 | 4000 | 280 |  |
| 8 | 35.0 | 15.0 |  | 45.0 | 5.0 | 43 | 2100 | 1.0 | 3000 | 240 | * |
| 9 | 30.0 | 17.5 | 2.5 | 47.5 | 2.5 | 27 | 2400 | 1.3 | 275 | 230 | ** |
| 10 | 27.5 | 17.5 | 5.0 | 45.0 | 5.0 |  |  |  |  |  | *** |

*Broad TCC
**Slight porosity
***Open porosity

Too high a Zr or Ca level leads to difficulty with densification. The calcium contained in the capacitors of Example 9 amounts to 5 mole percent of the alkaline earth metals therein. A little less calcium would have permitted full densification. Alternatively, full densification may be achieved by increasing the glass content a few percent, or by reducing the content of the zirconium.

From Example 4 it can be seen that as much as 7.8 mole percent calcium among the alkaline earth metals results in full densification and excellent properties. In general up to about 8 mole percent calcium may be employed. Also, from Example 5, it can be seen that this ceramic composition having 17.5 mole percent zirconium results in full densification. In general as much as 20 mole percent zirconium will be effective in the ceramic formulation. Only the capacitors of Examples 9 and 10 did not fully densify among the examples presented herein.

EXAMPLES 11, 12, 13, 14 AND 15

As well as the glass composition used in the previous examples, other glasses with similar properties in the other alkaline earth aluminoborate systems may be used. Examples of glass compositions used are given by metal oxide mole ratios in Table 2. In these examples, the various glasses were combined with the ceramic of Example 4. Inclusion of up to 50 mole percent of the alkali metal oxides is also permissible. $Li_2O$ in particular has been found to be effective in sharpening the permittivity peak of the glass-ceramic body as in Example 14.

On the other hand, glasses containing MgO as the only alkaline earth oxide tended to have a dielectric constant of less than 1000 and poor insulation resistance, as can be seen by the Example 13. Such MgO glasses are unsuitable for sole use in capacitors of this invention. However, the partial substitution of MgO for one of the other alkaline earth metal oxides in the glass may provide a high K and a fully densified body, and may be especially useful for providing a smoother peak at the Curie point in the temperature coefficient of capacity curve for certain applications.

All examples shown in Table 2 were fired with copper electrodes for 2 hours at 1050° C and at $5\times10^{-10}$ atmospheres of oxygen.

Table 2

| Ex. | Glass Composition (moles) | Density (g/cc) | Wt. (%) | Tc (° C) | K | DF(%) 1kHz, 1V | IR at 25° C | (ΩF) at 125° C |
|---|---|---|---|---|---|---|---|---|
| 4 | $4BaO \cdot Al_2O_3 \cdot 2B_2O_3$ | 3.93 | 6.8 | 32 | 3000 | 1.7 | 3300 | 300 |
| 11 | $21SrO \cdot 9Al_2O_3 \cdot 11B_2O_3$ | 3.28 | 5.7 | 10 | 2200 | 0.6 | 1900 | 75 |
| 12 | $4CaO \cdot 2Al_2O_3 \cdot 3B_2O_3$ | 2.70 | 5.0 | 18 | 2200 | 0.6 | 2300 | 90 |
| 13 | $2MgO \cdot Al_2O_3 \cdot 2B_2O_3$ | 2.55 | 5.0 | 10 | 900 | 6.0 | 1 | 1 |
| 14 | $2BaO \cdot Li_2O \cdot Al_2O_3 \cdot B_2O_3$ | 3.34 | 5.8 | 32 | 4000 | 1.6 | 1800 | 170* |
| 15 | $4BaO \cdot Al_2O_3 \cdot B_2O_3 \cdot SiO_2$ | 4.13 | 7.1 | 18 | 1250 | 1.7 | 5 | 1** |

*Sharp TCC
**Slight Porosity

It is also noted that the silica containing glass of Example 15 provided an incompletely densified body. No beneficial result is expected from the inclusion of any silica in the glass phase. Replacement of a minor amount of the boric oxide with other glass formers including silica may give acceptable results but it is greatly preferred that silica particularly not exceed about 1.5 percent by weight of the total glass formulation.

Although copper electrodes were used in all the previous examples, and are preferred, it is also permissible to use other base metal electrodes such as nickel or cobalt, or alloys containing major quantities of copper, nickel or cobalt, provided that the oxygen partial pressure during at least part of the firing cycle is less than that required for metal to metal-oxide thermodynamic equilibrium as is explained more fully in the aforementioned patent U.S. Pat. No. 3,902,102. If the metal used has a melting temperature higher than that of pure copper, firing temperatures above 1080° C could be used, although lower firing temperature range is still greatly preferred for the reasons explained hereinbefore. The oxygen partial pressure may be adjusted to a suitable level for the electrode material employed, by means of the readings on the oxygen monitor. For example, electrodes of nickel and also of cobalt were applied to wafers of the composition described in Example 1. These capacitors were fired at 1050° C for 2 hours with approximately $10^{-14}$ atmospheres oxygen partial pressure. The capacitors with the nickel electrodes had virtually identical capacitance-temperature characteristics to those of Example 1, and similar K (about 3500), whereas those with cobalt had broader capacitance-temperature characteristics and lower K (about 1750). This broadening indicated some interaction between the cobalt and the ceramic for the firing conditions used. Because of the more reducing conditions needed to prevent oxidation of the nickel and cobalt, insulation resistance was lower than that obtained with copper electrodes but was still greater than about 500 ohm-farads at 25° C.

With reference to the metal/metal-oxide equilibrium diagram disclosed in the latter mentioned patent, it can be seen that the use of an elementary copper electrode makes possible the firing of a monolithic capacitor of this invention at 1050° C in an atmosphere as oxygen rich as about $3\times10^{-6}$ atmospheres of oxygen.

What is claimed is:

1. A monolithic ceramic capacitor comprising: a reduction resistant glass-ceramic body having at room temperature a dielectric constant greater than 1000 and having a characteristic sintering and full densification temperature of from 1080° C to 950° C, said body consisting of from 5 to 15% by weight of a non-crystalline glass phase and from 85 to 95 percent by weight of a crystalline ceramic phase having a characteristic sintering and densification temperature greater than about 1200° C, said glass phase consisting essentially of an alkaline earth aluminoborate glass wherein said alkaline earth is selected from barium, strontium and calcium, said crystalline phase being an alkaline earth metal titanate wherein at least 50 mole percent of said alkaline earth metal is barium; a base metal electrode being buried within said reduction resistant glass-ceramic body; and another metal electrode contacting said body and being in capacitive relationship with said buried electrode.

2. The monolithic capacitor of claim 1 wherein said base metal is selected from copper, nickel, cobalt and alloys thereof.

3. The monolithic capacitor of claim 2 wherein said base metal consists essentially of copper.

4. The monolithic capacitor of claim 1 wherein said alkaline earth of said glass is partially replaced by magnesium.

5. The monolithic capacitor of claim 1 wherein an alkali-metal is substituted for up to 50 mole percent of said alkaline earth of said glass.

6. The monolithic capacitor of claim 1 wherein zirconium is substituted for up to 20 mole percent of the titanium of said titanate.

7. The monolithic capacitor of claim 1 wherein said titanate phase consists essentially of from 50 to 75 mole percent barium titanate and from 25 to 50 mole percent strontium titanate.

8. The monolithic capacitor of claim 1 wherein the said alkaline earth metal of said titanate is replaced by up to 8 mole percent calcium.

9. The monolithic capacitor of claim 1 wherein said alkaline earth metal titanate consists essentially of 60 mole percent barium titanate, 32.2 mole percent strontium titanate and 7.8 mole percent calcium titanate.

10. The monolithic capacitor of claim 1 wherein said glass phase includes no more than about 1 mole percent silica.

11. A method for making a monolithic ceramic capacitor having a reduction resistant glass-ceramic body exhibiting a dielectric constant at room temperature greater than 1000 and having a buried base metal electrode comprising:

(a) preparing a slip consisting of a glass powder, a precursor powder of a crystalline ceramic material and a binder medium, said glass consisting essentially of an alkaline earth aluminoborate glass wherein said alkaline earth is selected from barium, strontium and calcium, said at least one ceramic material having a characteristic sintering and densification temperature greater than 1200° C, said ceramic material being a titanate of alkaline earth metal wherein at least 50 mole percent of said alkaline earth metal is barium, said glass powder being from 5–15% by weight of said glass and said ceramic powders combined;

(b) forming a plurality of layers of said slip;

(c) preparing an electroding base metal paste comprised of base metal particles and a binder medium and applying a coating of said paste to a surface of at least one of said layers;

(d) stacking at least two of said layers so as to bury within said stack said electroding base metal coating of said at least one layer;

(e) heating said stack with said buried base metal coating at a temperature of from 1080° C to 950° C in an atmosphere of partial oxygen pressure less than $3 \times 10^{-6}$ atmospheres to sinter and fully densify said glass-ceramic stack, and to fire said buried coating to form a buried base metal electrode within said sintered capacitor body; and (f) applying to said stack another metal coating in spaced relationship to said buried electrode to serve as a second electrode of said capacitor.

12. The method of claim 11 wherein, at the particular temperature of said heating, said partial oxygen pressure is less than that required for metal to metal-oxide thermodynamic equilibrium.

13. The method of claim 11 additionally comprising applying a film of said base metal paste to a face of said stack and in contact with an edge of said at least one electroding coating prior to said heating to provide an electrical termination to said buried electrode.

14. The method of claim 11 wherein said base metal is selected from copper, nickel, cobalt and alloys thereof.

15. The method of claim 11 wherein said base metal consists essentially of copper.

16. The method of claim 15 wherein said temperature of said heating is about 1050° C and said partial oxygen pressure is about $3 \times 10^{-6}$ atmospheres of oxygen.

17. The method of claim 11 wherein said alkaline earth of said glass is partially replaced by magnesium.

18. The method of claim 11 wherein an alkali metal is substituted for up to 50 mole percent of said alkaline earth of said glass.

19. The method of claim 11 wherein zirconium is substituted for up to 20 mole percent of the titanium of said titanate.

20. The method of claim 11 wherein said titanate consists essentially of from 50 to 75 mole percent barium titanate and from 25 to 50 mole percent strontium titanate.

21. The method of claim 11 wherein said alkaline earth metal titanate consists essentially of 60 mole percent barium titanate, 32.2 mole percent strontium titanate and 7.8 mole percent calcium titanate.

* * * * *